United States Patent Office 2,798,073
Patented July 2, 1957

2,798,073
PIPERIDINE DERIVATIVES AND PREPARATION THEREOF

John Lee, Essex Fells, and Albert Ziering, Nutley, N. J., assignors to Hoffmann-La Roche Inc., Nutley, N. J., a corporation of New Jersey No Drawing. Application January 31, 1955, Serial No. 485,308

15 Claims. (Cl. 260—294.3)

This invention relates to novel chemical compounds, and to novel processes and novel intermediates in the preparation thereof.

An important aspect of the invention relates to bases of the class 1 - methyl - 3 - allyl - 4 - phenyl - 4 - alkanoyloxy-piperidine wherein the alkanoyl radical contains from 2 to 4 carbon atoms, and to acid addition salts thereof. These bases and their acid addition salts are useful as medicinals, more particularly as analgesic compounds; characterized by their excellent analgesic activity, quick onset of the analgesic action, relatively short duration of the analgesic action, and relative absence of hypnotic action.

Another aspect of the invention relates to novel processes useful in making the above identified bases and acid addition salts.

Still a further aspect of the invention relates to novel intermediates useful in the preparation of the above identified bases and acid addition salts.

A comprehensive embodiment of the invention can be visualized in terms of the following flow sheet, wherein—

$R^1$ represents a lower alkyl radical,
$R^2$ represents a lower alkyl radical,
M represents a monovalent radical selected from the class of —Li and —Mg-halide radicals, and
R represents an alkyl radical having from 1 to 3 carbon atoms.

FLOW SHEET (I)   $CH_2=C-COOR^1$
            |
       $CH_2-CH=CH_2$

Lower alkyl α-allylacrylate

| + $CH_3NH_2$
↓ Methylamine (II)   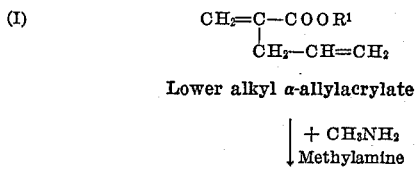

Lower alkyl α-allyl-β-methyl-amino-propionate

| + $CH_2=CH-COOR^2$
↓ Lower alkyl acrylate (III)  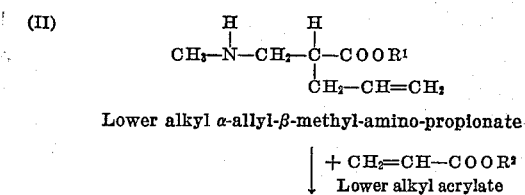

Di(lower alkyl) α-allyl-β,β'-methylimino-dipropionate

| 1. condense (using Li, Na, LiH, NaH, LiNH₂ or NaNH₂ as condensing agent)
↓ 2. hydrolyze and decarboxylate (IV)   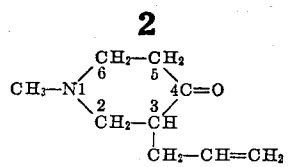

1-methyl-3-allyl-4-piperidone

| 1. + $C_6H_5$—M
↓   Organometallo-phenyl compound
    2. hydrolyze (V)    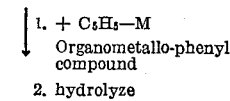

1-methyl-3-allyl-4-phenyl-4-hydroxy-piperidine

| + $(RCO)_2O$
↓ Acylating agent (VI)   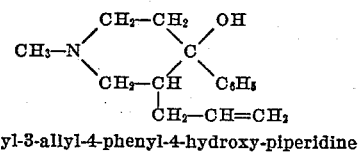

1-methyl-3-allyl-4-phenyl-4-alkanoyloxy-piperidine

In the embodiment graphically represented by the above flow sheet, the invention provides a process for making 1 - methyl - 3 - allyl - 4 - phenyl - 4 - alkanoyloxy - piperidine wherein the alkanoyl radical contains from 2 to 4 carbon atoms, which comprises the steps of condensing lower alkyl α-allylacrylate (I) with methylamine thereby producing lower alkyl α-allyl-β-methylamino-propionate (II), condensing the latter with lower alkyl acrylate thereby producing di(lower alkyl) α-allyl-β,β'-methylimino-dipropionate (III), subjecting the latter to ring closure thereby producing 1-methyl-3-allyl-4-piperidone (IV), reacting the latter with an organometallophenyl compound $C_6H_5$—M, as above defined, and hydrolyzing thereby producing 1-methyl-3-allyl-4-phenyl-4-hydroxy-piperidine (V), and reacting the latter with an acylating agent wherein the acyl radical is an alkanoyl radical having from 2 to 4 carbon atoms thereby producing 1 - methyl-3-allyl-4-phenyl-4-alkanoyloxy-piperidine wherein the alkanoyl radical has from 2 to 4 carbon atoms (VI).

A preferred form of the process described in the flow sheet comprises condensing ethyl α-allyl-acrylate with methylamine thereby producing ethyl α-allyl-β-methylamino-propionate, condensing the latter with ethyl acrylate thereby producing diethyl α-allyl-β,β'-methyliminodipropionate, subjecting the latter to ring closure by heating in the presence of sodium thereby producing carbethoxy-1-methyl-3-allyl-4-piperidone, heating the latter in dilute aqueous acidic medium with a mineral acid (preferably dilute aqueous hydrochloric or hydrobromic acid) thereby producing an addition salt of 1-methyl-3-allyl-4-piperidone with said mineral acid, neutralizing said acid addition salt of 1-methyl-3-allyl-4-piperidone thereby releasing the free base, condensing the resulting 1 - methyl - 3 - allyl - 4 - piperidone with lithium phenyl and hydrolyzing the resulting lithiumoxy condensation product thereby producing 1-methyl-3-allyl-4-phenyl-4-hydroxy-piperidine, and reacting the resulting 1-methyl-3-allyl-4-phenyl-4-hydroxy-piperidine with an acid anyhydride wherein the acyl radical is an alkanoyl radical having from 2 to 4 carbon atoms.

1 - methyl - 3-allyl-4-phenyl-4-alkanoyloxy-piperidine, Formula VI above, is a base which readily forms acid addition salts with acids. Particularly preferred for use in medicinal compositions are the acid addition salts of said base of Formula VI with non-toxic acids of the type conventionally employed in the preparation of medicinally useful salts of pharmacologically active bases; e. g. strong mineral acids, such as hydrochloric acid, hydrobromic acid, nitric acid, sulfuric acid and phosphoric acid, and organic acids such as acetic acid, palmitic acid, malic acid, tartaric acid, oxalic acid, citric acid, d-camphorsulfonic acid, ethanesulfonic acid, and the like.

The bases represented by Formulas II, III, IV and V above likewise form acid addition salts with acids. The acids ordinarily preferred to form addition salts when using these bases as intermediates, e. g. in procedures for manufacturing or purifying said base intermediates, are the strong mineral acids, such as hydrochloric, hydrobromic, nitric, sulfuric and phosphoric acids. When effecting resolution of optical antipodes, it is of course desirable to use optically active organic acids, e. g. d- or l-tartaric acid, d-camphorsulfonic acid, etc.

The base represented by Formula IV in the above flow sheet has a center of asymmetry at carbon atom 3. The bases represented by Formulas V and VI in the above flow sheet have two centers of asymmetry at carbon atoms 3 and 4. Accordingly, all of these bases, and the acid addition salts derived therefrom, can exist in a number of stereoisomeric forms. It should be understood that the invention embraces generically all of the stereoisomeric forms of the novel compounds graphically represented in the above flow sheet.

The invention is further disclosed in the following examples, which are illustrative but not limitative thereof:

Example 1

545 g. of the known compound ethyl α-allylacrylate was dissolved in 500 cc. of absolute ethanol, and the solution was added to a solution of 121 g. of methylamine in 500 cc. of absolute ethanol. The reaction mixture was heated in an autoclave for 5 hours at 100° C. in a nitrogen atmosphere under a pressure of 600 p. s. i. gauge. At the end of this time the solvent was driven off and the residue was fractionated under reduced pressure. The fraction distilling at 115–119° C./35 mm. Hg was ethyl α-allyl-β-methylamino-propionate. Yield: 507 g. (76 percent of theory).

Example 2

1385 g. of ethyl α-allyl-β-methylamino-propionate was added to 1100 g. of ethyl acrylate and the mixture was heated in an autoclave at 100° C. for 6 hours in a nitrogen atmosphere under a pressure of 600 p. s. i. gauge. The reaction mixture was then distilled under reduced pressure. The fraction distilling at 141–146° C./4 mm. Hg was diethyl α-allyl-β,β'-methylimino-dipropionate. Yield: 1962 g. (90 percent of theory).

Example 3

1962 g. of diethyl α-allyl-β,β'-methylimino-dipropionate was added in a slow stream to 167 g. of sodium shot in 4 liters of toluene heated initially to 90° C. The diester was added at such a rate that the reaction mixture refluxed gently. After the addition had been completed, the reaction mixture was cooled to 30° C. and the whole of a hydrochloric acid solution, formed by diluting 1770 cc. of concentrated (37 percent aqueous) hydrochloric acid to 4 liters, was added. The toluene layer was separated, and the aqueous acidic solution was refluxed until a drop of the solution, diluted with 1 cc. of water, was not colored by the addition of a drop of a 1 percent solution of ferric chloride. The reaction mixture was then concentrated in vacuo to about 500 cc., cooled, and 50 percent aqueous sodium hydroxide solution was added thereto until the solution was strongly alkaline (pH 12). An oil separated, which was extracted with ether. The ether extract was dried over anhydrous potassium carbonate, the solvent was removed, and the residue was distilled in vacuo. The fraction distilling at 112–116° C./30 mm. Hg was 1-methyl-3-allyl-4-piperidone. Yield: 383 g. (34.5 percent of theory).

Example 4

383 g. of 1-methyl-3-allyl-4-piperidone was added dropwise to the whole of a solution of phenyl lithium, prepared from 52.5 g. of lithium and 588 g. of bromobenzene, in 4 liters of dry diethyl ether at 10° C. After the addition, 500 cc. of water was added; then the ether layer was separated and dried over anhydrous potassium carbonate. The ether was distilled off and the residue was crystallized from petroleum ether (B. P. 60–80° C.). Upon filtration, dl-α-1-methyl-3-allyl-4-phenyl-4-hydroxypiperidine remained upon the filter. M. P. 111–112° C. Yield: 300 g. (52 percent of theory). (The more difficultly soluble stereoisomeric form, which crystallizes out first, is here arbitrarily designated the α-form; its diastereoisomer is designated the β-form.)

The filtrate, upon concentration, yielded a mixture of the dl-α- and dl-β-isomers, M. P. 65–95° C. Yield: 100 g. By repeated crystallizations, dl-β-1-methyl-3-allyl-4-phenyl-4-hydroxy-piperidine was obtained in pure form, M. P. 85–86° C. (from petroleum ether, B. P. 30–60° C.).

Example 5

5 g. of dl-α-1-methyl-3-allyl-4-phenyl-4-hydroxy-piperidine was added to 15 cc. of n-propionic anhydride and the solution was heated on a steam bath for 5 hours. The excess propionic anhydride was distilled off in vacuo and the residue was dissolved in diethyl ether. Dry hydrogen chloride gas was bubbled into the ether solution until no further precipitate was obtained. The precipitate of dl-α-1-methyl-3-allyl-4-phenyl-4-n-propionoxy-piperidine hydrochloride was recrystallized from a mixture of acetone and methanol, M. P. 186–187° C.

dl-α-1-methyl-3-allyl-4-phenyl-4-acetoxy-piperidine hydrochloride, similarly prepared by substituting for the propionic anhydride an equimolar proportion of acetic anhydride, melted at 210–211° C. after recrystallization from acetone.

dl-α-1-methyl-3-allyl-4-phenyl-4-n-butyroxy-piperidine hydrochloride, similarly prepared by substituting for the propionic anhydride an equimolar proportion of n-butyric anhydride, melted at 151–153° C. after recrystallization from acetone.

By acylating dl-β-1-methyl-3-allyl-4-phenyl-4-hydroxy-piperidine with n-propionic anhydride and bubbling hydrogen chloride into the ether solution of the base, using the same procedure as set forth in the first paragraph of this example, dl-β-1-methyl-3-allyl-4-phenyl-4-n-propionoxy-piperidine hydrochloride was obtained, M. P. 206–207° C. after recrystallization from acetone-methanol.

1 g. of dl-α-1-methyl-3-allyl-4-phenyl-4-n-propionoxy-piperidine dissolved in 1 cc. of ethyl acetate was mixed with 0.45 g. of dl-malic acid. The mixture was cooled and upon standing dl-α-1-methyl-3-allyl-4-phenyl-4-n-propionoxy-piperidine malate crystallized out, M. P. 101–102° C.

1 g. of dl-α-1-methyl-3-allyl-4-phenyl-4-n-propionoxy-piperidine was mixed with 0.31 g. of anhydrous oxalic acid in 5 cc. of diethyl ether. The reaction mixture was cooled and allowed to stand, whereupon dl-α-1-methyl-3-allyl-4-phenyl-4-n-propionoxy-piperidine oxalate crystallized out, M. P. 186–187° C.

1 g. of dl-α-1-methyl-3-allyl-4-phenyl-4-n-propionoxy-piperidine was mixed with 0.23 cc. of concentrated aqueous (approximately 69 percent by weight) nitric acid in 5 cc. of diethyl ether. Upon cooling and standing, dl-α-1-methyl-3-allyl-4-phenyl-4-n-propionoxy-piperidine nitrate crystallized out, M. P. 194–195° C.

We claim:

1. A process which comprises condensing lower alkyl α-allylacrylate with methylamine thereby producing lower alkyl α-allyl-β-methylamino-propionate, condensing the latter with lower alkyl acrylate thereby producing di(lower alkyl) α-allyl-β,β'-methylimino-dipropionate, subjecting the later to ring closure thereby producing 1-methyl-3-allyl-4-piperidone, reacting the latter with an organometallo-phenyl compound and hydrolyzing thereby producing 1-methyl-3-allyl-4-phenyl-4 - hydroxy - piperdine, and reacting the latter with an acylating agent wherein the acyl radical is an alkanoyl radical having from 2 to 4 carbon atoms thereby producing 1 - methyl - 3 - allyl - 4 - phenyl - 4 - alkanoyloxy - piperidine wherein the alkanoyl radical has from 2 to 4 carbon atoms.

2. A compound selected from the group consisting of lower alkyl α-allyl-β-methylamino-propionate and acid addition salts thereof.

3. A process of making lower alkyl α-allyl-β-methylamino-propionate which comprises condensing lower alkyl α-allylacrylate with methylamine.

4. A compound selected from the group consisting of di(lower alkyl) α-allyl-ββ,'-methylimino-dipropionate and acid addition salts thereof.

5. A process of making di(lower alkyl) α-allyl-β,β'-methylimino-dipropionate which comprises condensing lower alkyl α-allyl-β-methylamino-propionate with lower alkyl acrylate.

6. A compound selected from the group consisting of 1-methyl-3-allyl-4-piperidone and acid addition salts thereof.

7. A process of making 1-methyl-3-allyl-4-piperidone which comprises subjecting di(lower alkyl) α-allyl-β,β'-methylimino-dipropionate to ring closure.

8. A compound selected from the group consisting of 1-methyl-3-allyl-4-phenyl-4-hydroxy-piperidine and acid addition salts thereof.

9. A process of making 1-methyl-3-allyl-4-phenyl-4-hydroxy-piperidine which comprises reacting 1-methyl-3-allyl-4-piperidone with an organometallophenyl compound and hydrolyzing.

10. A compound selected from the group consisting of 1-methyl-3-allyl-4-phenyl-4 - alkanoyloxy piperidine wherein the alkanoyl radical contains from 2 to 4 carbon atoms and acid addition salts thereof.

11. 1-methyl-3-allyl-4-phenyl-4-alkanoyloxy-piperidine wherein the alkanoyl radical has from 2 to 4 carbon atoms.

12. A process of making a compound according to claim 11 which comprises reacting 1-methyl-3-allyl-4-phenyl-4-hydroxy-piperidine with an acylating agent wherein the acyl radical is an alkanoyl radical having from 2 to 4 carbon atoms.

13. An acid addition salt of a compound according to claim 11.

14. 1-methyl-3-allyl-4-phenyl-4-n - propionoxy - piperidine.

15. An acid addition salt of a compound according to claim 14.

References Cited in the file of this patent

UNITED STATES PATENTS

| | | |
|---|---|---|
| 2,498,432 | Lee | Feb. 21, 1950 |
| 2,498,433 | Lee | Feb. 21, 1950 |